United States Patent [19]
Nobe et al.

[11] Patent Number: 5,710,473
[45] Date of Patent: Jan. 20, 1998

[54] FIXING STRUCTURE FOR A COMMUTATOR, INSULATOR FOR A MOTOR CORE, AND MOTOR STRUCTURE

[75] Inventors: Tadahisa Nobe; Takeshi Yanagiya; Katsuhiko Torii; Yuichi Terada, all of Shizuoka-ken, Japan

[73] Assignee: Asmo Co., Ltd., Shizuoka-ken, Japan

[21] Appl. No.: 525,217

[22] Filed: Sep. 8, 1995

[30] Foreign Application Priority Data

Sep. 9, 1994 [JP] Japan .................................. 6-216376

[51] Int. Cl.$^6$ ........................................... H02K 13/00
[52] U.S. Cl. ............................... 310/236; 310/235
[58] Field of Search .......................... 310/42, 43, 216, 310/233, 235, 236

[56] References Cited

U.S. PATENT DOCUMENTS

| | | | |
|---|---|---|---|
| 2,831,991 | 4/1958 | Perkins | 310/43 |
| 3,831,268 | 8/1974 | Boyd et al. | 310/216 |
| 3,917,967 | 11/1975 | Robison | 310/42 |
| 5,113,105 | 5/1992 | Ikegami et al. | 310/233 |
| 5,144,182 | 9/1992 | Lemmer et al. | 310/43 |
| 5,459,365 | 10/1995 | Yuhi | 310/233 |

FOREIGN PATENT DOCUMENTS

| | | |
|---|---|---|
| 2296286 | 8/1976 | France . |
| 3049952 | 5/1982 | Germany . |
| 9401565 | 1/1995 | Germany . |
| 55-46853 | 4/1980 | Japan . |
| 62-165758 | 10/1987 | Japan . |
| 62-233046 | 10/1987 | Japan . |
| 2-10774 | 1/1990 | Japan . |
| 1420013 | 1/1976 | United Kingdom . |

*Primary Examiner*—Clayton E. Laballe
*Attorney, Agent, or Firm*—Hazel & Thomas

[57] ABSTRACT

A motor has an armature that includes a motor core and a commutator. An insulator for insulating the motor core is composed of winding insulating portions and a shaft insulating portion integral with the winding insulating portions. A connecting portion is formed at the end of the shaft insulating portion. The connecting portion is inserted into an insertion groove of the commutator for integral connection. Specifically, the insulator is fixed to the armature shaft by the application of windings, and the commutator is connected and fixed to the insulator. Accordingly, a larger fixing force can be obtained compared to conventional structures, and the use of an adhesive and highly accurate machining become unnecessary, thereby decreasing costs.

16 Claims, 7 Drawing Sheets

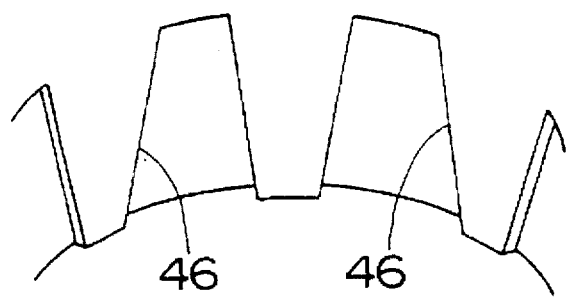
F I G. 5A
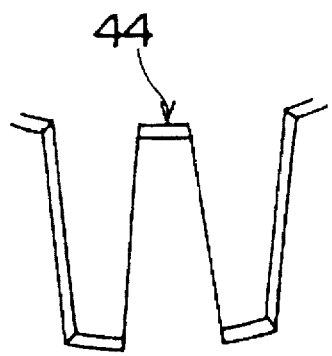
F I G. 5B
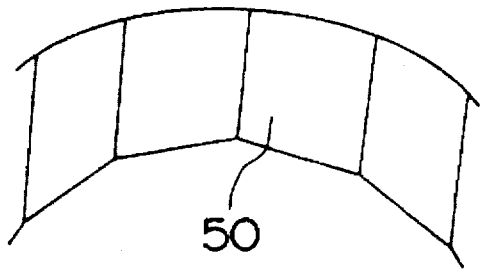
F I G. 6A
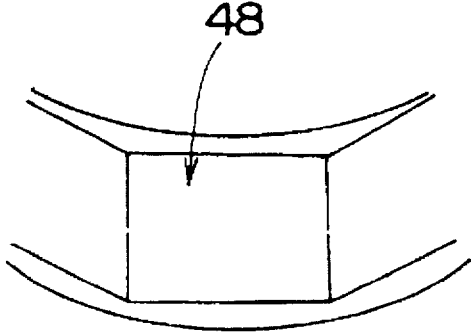
F I G. 6B F I G. 9A
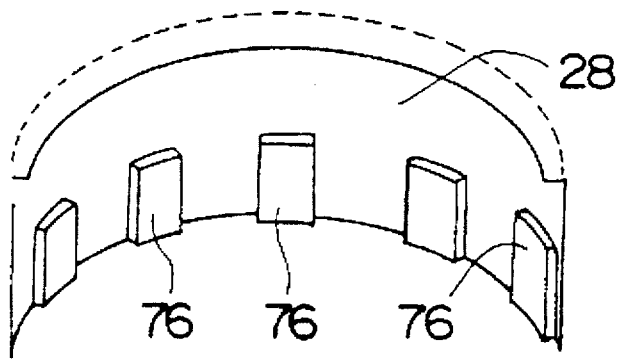
F I G. 9B
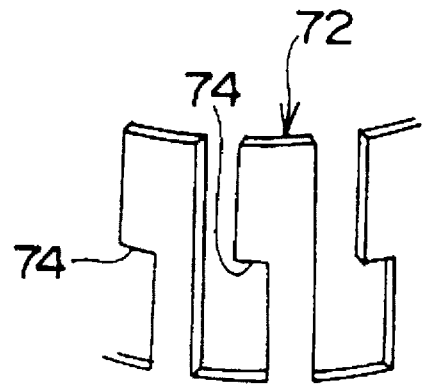

FIXING STRUCTURE FOR A COMMUTATOR, INSULATOR FOR A MOTOR CORE, AND MOTOR STRUCTURE

BACKGROUND OF THE INVENTION

1. Field of the Invention

The present invention relates to a fixing structure for fixing a commutator to an armature shaft of a motor, an insulator for a motor core of the motor, and the structure of the motor.

2. Description of the Related Art

In a motor for driving a wiper of an automobile, for example, a commutator having a core portion made of an insulating material is fitted onto an armature shaft.

Conventionally, the following structures have been employed to attach and fix a commutator to an armature shaft: (1) a structure in which the commutator is press-fitted onto the armature shaft, (2) a structure in which the armature shaft and the commutator are provided with engagement grooves which are mated with each other, (3) a structure in which the outer circumference of the armature shaft is knurled, and the commutator is fixed to the armature shaft such that the knurls bite the commutator, and (4) a structure in which the commutator is fixed to the armature shaft with an adhesive. However, these conventional fixing structures have problems such as a weak fixing force and a necessity for complex fixing work, so they have room for improvement.

In the structure (1) in which the commutator is press-fitted onto the armature shaft, the fixing force is easily affected by the dimensional accuracy of the outer diameter of the armature shaft and the dimensional accuracy of the inner diameter of the commutator. If the amount of interference between the armature shaft and the commutator is insufficient, a proper fixing force cannot be obtained. If the amount of interference is excessive, there is a chance that the commutator will break.

In the structure (2) in which the armature shaft and the commutator are mated with each other by engagement grooves, the fixing force is easily affected by the dimensional accuracy of the engagement grooves, as in the preceding structure (1). Also, since the fixing force in the axial direction is relatively small, an adhesive must be used as an auxiliary measure.

In the structure (3) in which the outer circumferential of the armature shaft is knurled and the commutator is fixed to the armature shaft such that the knurls bite the commutator, there is a possibility that the commutator will be broken when the amount of interference is too large. Moreover, this structure requires higher costs compared to other fixing structures.

In the method (4) in which the commutator is fixed to the armature shaft with an adhesive, a heating step is essential to harden the adhesive, which increases the number of processing stages and the processing time, thereby increasing the costs.

SUMMARY OF THE INVENTION

In view of the foregoing, an object of the present invention is to provide a fixing structure for fixing a commutator, an insulator for a motor core of the motor, and a motor structure that which can increase the fixing force of the commutator without a special machining step and reduce costs while guaranteeing the insulating performance to enhance the quality.

According to a first aspect of the present invention, a fixing structure is provided to fix a commutator having a core portion made of an insulating material and fitted onto an outer periphery of an armature shaft. The core portion of the commutator is integrally connected to an insulator which insulates the winding portion of a motor core.

In this structure, by forming windings, the insulator is fixed to the armature shaft and the commutator is integrally connected and fixed to the insulator.

Accordingly, the fixing force can be greatly increased compared to conventional structures. Also, since it is unnecessary to form engagement grooves or knurls in the armature shaft, or to use an adhesive, the machining process and the facilities therefor can be simplified and the machining time can be shortened, so that the costs can be reduced. Moreover, a sufficient fixing force can be obtained even when the amount of interference between the core portion of the commutator and the armature shaft is decreased. This eliminates the necessity of highly accurate machining, thereby further decreasing the costs.

Also, since the core portion of the commutator made of an insulating material is integrally connected to an insulator which insulates the winding portion of the motor core, the winding is prevented from contacting the armature shaft in the area between the insulator and the core portion of the commutator. This guarantees the insulating performance and thereby improves the quality.

In the fixing structure according to the first aspect of the present invention, the insulator may include a shaft insulating portion which is fitted onto the armature shaft, and a connecting portion provided at an end of the shaft insulating portion. The connecting portion may include protrusions and depressions which are alternately formed in the circumferential direction at predetermined intervals. Also, the core portion of the commutator may have an insertion groove in which protrusions and depressions are alternately formed in the circumferential direction at predetermined intervals. The connecting portion may be inserted into the insertion groove for connection therebetween.

With this structure, since the protrusions and depressions of the connecting portion are engaged with the protrusions and depressions of the insertion groove, it becomes possible to prevent the commutator from slipping out in the axial direction and from rotating.

Accordingly, since it is unnecessary to form engagement grooves or knurls in the armature shaft or to use an adhesive, the machining process and the facilities therefor can be simplified and the machining time can be shortened, so that costs can be reduced.

According to a second aspect of the present invention, an insulator for a motor core is provided. The insulator includes winding insulating portions for insulating the winding portion of the motor core, a shaft insulating portion which is formed integrally with the winding insulating portions and is fitted onto the armature shaft, and a connecting portion which is provided at an end of the shaft insulating portion and which is integrally connected with a core portion of a commutator.

According to a third aspect of the present invention, a motor structure is provided which includes a commutator which has a core portion made of an insulating material and which is fitted onto an armature shaft, and an insulator which insulates a motor core. The insulator includes winding insulating portions for insulating the winding portion of the motor core, a shaft insulating portion which is formed integrally with the winding insulating portions and is fitted onto the armature shaft, and a connecting portion which is provided at an end of the shaft insulating portion and which is integrally connected with the core portion of the commutator. The core portion of the commutator is provided with an insertion groove into which the connecting portion of the shaft insulating portion is inserted for integral connection. After the connecting portion is inserted into the insertion groove for integral connection, a winding is applied between the winding insulating portions and the commutator to fix the commutator to the motor core.

When the insulator according to the second aspect or the motor structure according to the third aspect is employed, the winding insulating portions of the insulator provide insulation for the winding portion of the motor core, and the shaft insulating portion integrally formed with the winding insulating portions is fitted onto the armature shaft to provide insulation for the armature shaft. The connecting portion provided at the end of the shaft insulating portion is integrally connected to the core portion of the commutator. That is, the insulator is fixed to the armature shaft by the application of a winding, and the commutator is integrally connected to the insulator for affixing thereto.

With this, the fixing force can be greatly increased compared to conventional structures. Also, since it is unnecessary to form engagement grooves or knurls in the armature shaft or to use an adhesive, the machining process and the facilities therefor can be simplified and the machining time can be shortened, so that the costs can be reduced. Moreover, a sufficient fixing force can be obtained even when the amount of interference between the core portion of the commutator and the armature shaft is decreased. This eliminates the necessity of highly accurate machining, thereby decreasing the costs even more.

Also, since the shaft insulating portion of the insulator which is fitted onto the armature shaft provides insulation for the armature shaft in the area between the insulator and the core portion of the commutator, there is no possibility of the winding contacting the armature shaft in the area between the insulator and the core portion of the commutator. This secures the insulating performance and thereby improves the quality.

BRIEF DESCRIPTION OF THE DRAWINGS

FIGS. 5A and 5B are perspective views showing the connecting portions of the commutator and the insulator according to still another embodiment of the present invention;

FIGS. 6A and 6B are perspective views showing the connecting portions of the commutator and the insulator according to still another embodiment of the present invention;

FIGS. 9A and 9B are perspective views showing the connecting portions of the commutator and the insulator according to still another embodiment of the present invention;

DETAILED DESCRIPTION OF THE PREFERRED EMBODIMENTS

Figure 1:
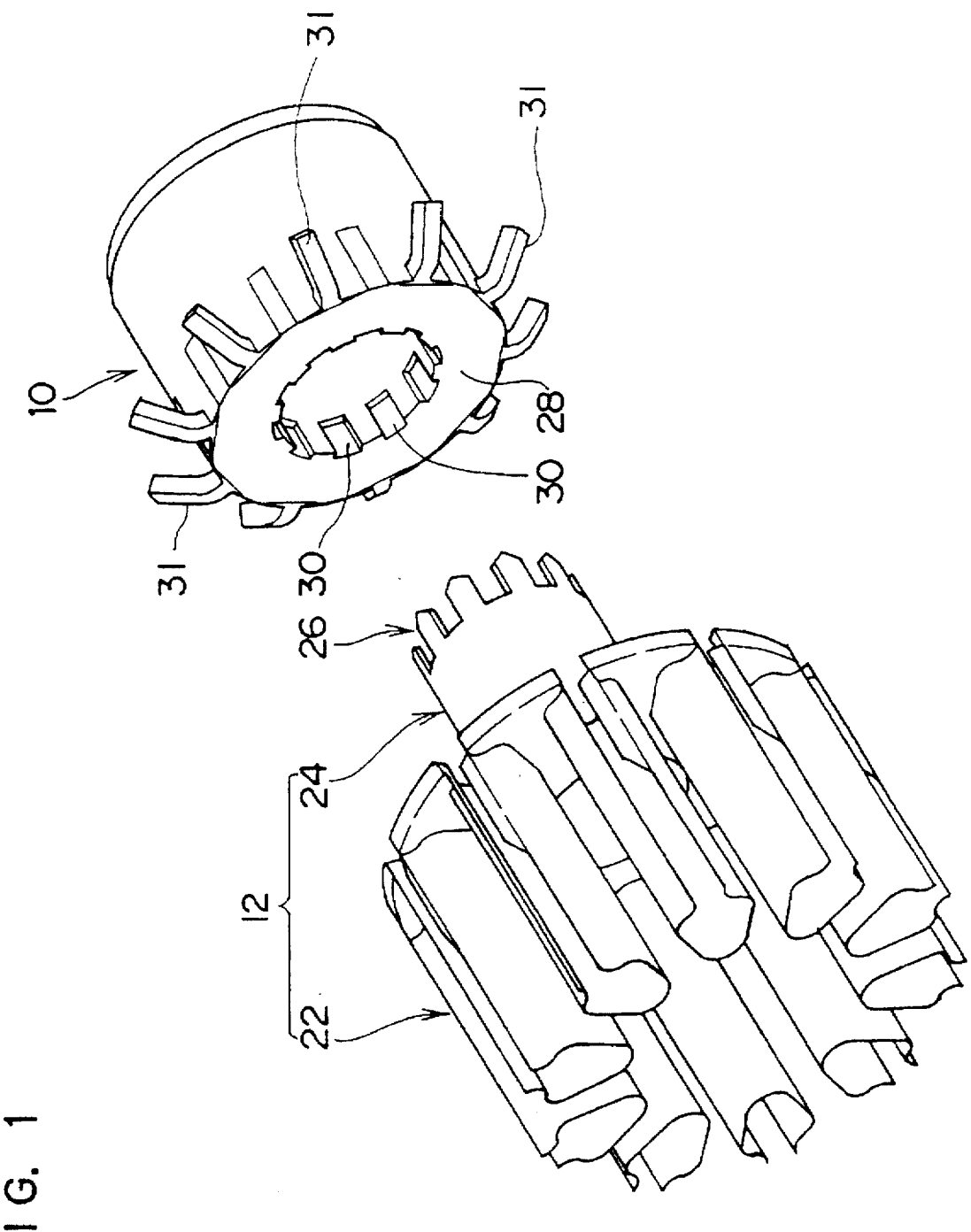
FIG. 1 is an exploded perspective view showing a commutator and an insulator for insulating a motor core to which a fixing structure according to an embodiment of the present invention is applied.
Figure 2:
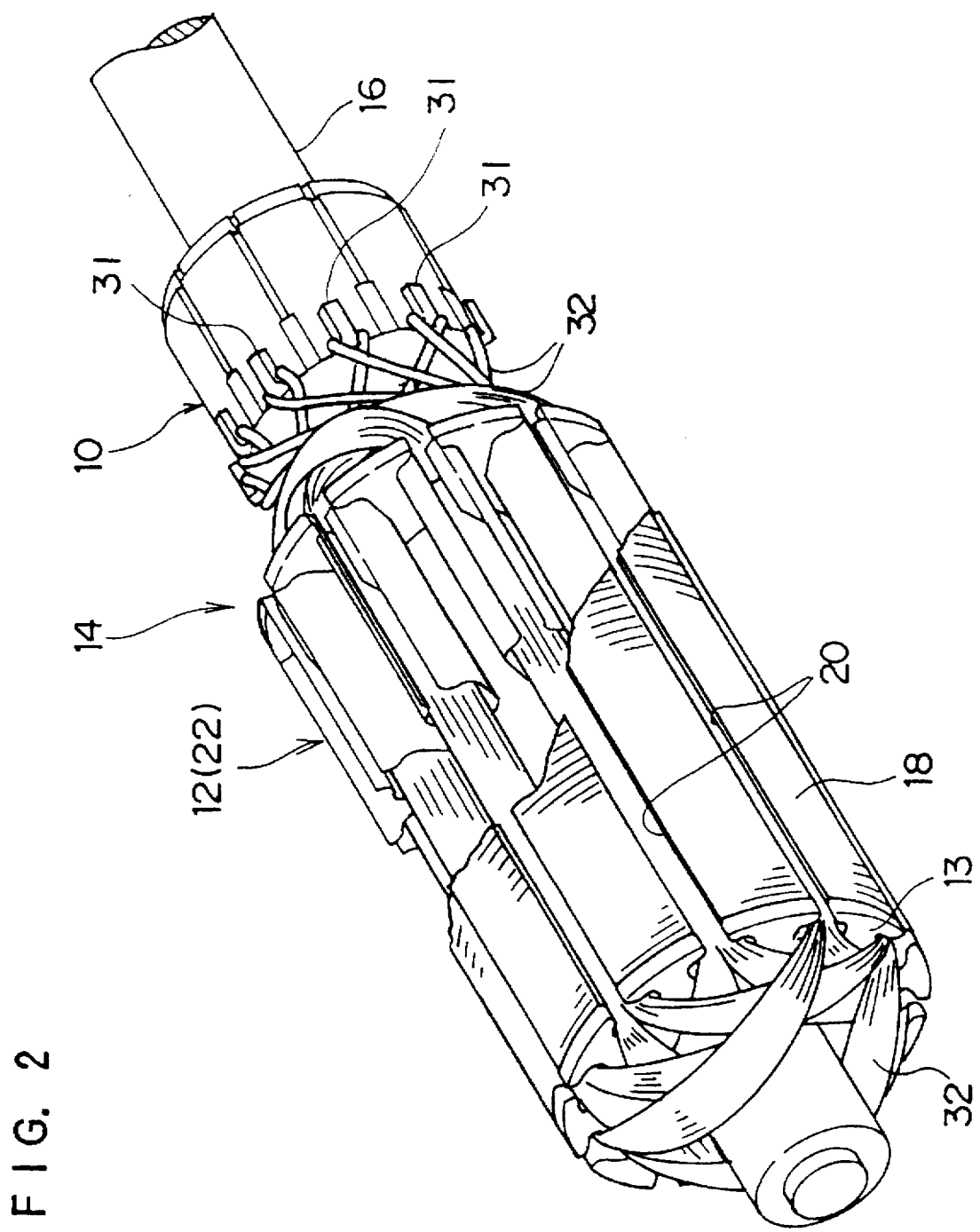
FIG. 2 is a perspective view of an armature of a motor which is assembled using the commutator and the insulator shown in FIG. 1, wherein part of the armature is removed.

FIG. 1 shows an exploded perspective view of a commutator 10 and a motor core insulator 12, to which a fixing structure according to an embodiment of the present invention is applied. The commutator 10 shown in FIG. 1 is in a state before undergoing surface grinding. FIG. 2 is a perspective view of an armature 14 of a motor which is assembled using the commutator 10 and the insulator 12, wherein part of the armature 14 is removed.

A motor core 18 is securely fixed to an armature shaft 16 by press fitting to form the armature 14. The motor core 18 is provided with a plurality of slots 20 at predetermined intervals. The above-described insulator 12 is attached to one axial end of the motor core 18 while another insulator 13 is attached to the other axial end of the motor core 18. The insulator 12 shown in FIG. 1 is made of a resin (insulating material), and is composed of a plurality of winding insulating portions 22 and a shaft insulating portion 24. The winding insulating portions 22 are disposed at a predetermined pitch corresponding to that of the slots 20 of the motor core 18. Each of the winding insulating portions 22 has a roughly V-shaped cross section.

The shaft insulating portion 24 is formed integrally with the ends of the winding insulating portions 22. The shaft insulating portion 24 has a cylindrical shape conforming to the shape of the armature shaft 16 and is coaxial with an imaginary cylinder formed by the winding insulating portions 22. The armature shaft 16 is inserted into the shaft insulating portion 24 while the winding insulating portions 22 are fitted into the slots 20 of the motor core 18. A connecting portion 26 is formed at the end of the shaft insulating portion 24. In the connecting portion 26, protrusions and depressions are alternately formed in the circumferential direction at predetermined intervals such that they face a core portion 28 of the commutator 10.

The core portion 28 of the commutator 10 is made of a resin (insulating material) and is fitted onto the armature shaft 16. The core portion 28 is formed with an insertion groove 30 which face the connecting portion 26 of the insulator 12. In the insertion groove 30, protrusions and depressions are alternately formed in the circumferential direction at predetermined intervals so as to receive the connecting portion 26 therein. The commutator 10 is integrally connected to the insulator 12 by inserting the connecting portion 26 into the insertion groove 30.

After the insulator 12 is attached to the motor core 18 and the commutator 10 is integrally connected to the insulator 12, windings 32 are applied in the slots 20 of the motor core 18 (in the winding insulating portions 22 of the insulator 12) such that the windings 32 are engaged on hooks 31. With this structure, the winding insulating portions 22 provide insulation for the slots 20 of the motor core 18, and the shaft insulating portion 24 fitted onto the armature shaft 16 provides insulation for the armature shaft 16. When the windings 32 are applied, the insulator 12 is fixed to the armature shaft 16 and the motor core 18. Subsequently, the commutator 10 is fixed to the armature shaft 16 together with the insulator 12 by connecting the core portion 28 of the commutator 10 with the connecting portion 26 of the insulator 12.

The operation of the present embodiment will now be described.

In the armature 14 having the above-described structure, the winding insulating portions 22 of the insulator 12 insulate the slots 20 of the motor core 18, and the shaft insulating portion 24 integrally formed with the winding insulating portions 22 is fitted onto the armature shaft 16 to insulate the armature shaft 16. Also, the connecting portion 26 provided at the end of the shaft insulating portion 24 is inserted into the insertion groove 30 of the core portion 28 of the commutator 10 for integral connection. That is, when the windings 32 are applied, the commutator 10 is drawn toward the motor core 18. Accordingly, the insulator 12 which is integrally connected to the commutator 10 is also drawn toward the motor core 18 so that the commutator 10 and the insulator 12 are integrally fixed to the armature shaft 16 and the motor core 18.

Accordingly, the fixing force can be greatly increased compared to conventional structures. Also, since it is unnecessary to form engagement grooves or knurls in the armature shaft 16 or to use an adhesive, the machining process and the facilities therefor can be simplified and the machining time can be shortened in order to reduce costs. Moreover, sufficient fixing force can be obtained even when the amount of interference between the core portion 28 of the commutator 10 and the armature shaft 16 is decreased. This eliminates the necessity of highly accurate machining, thereby decreasing costs even further.

Also, the core portion 28 of the commutator 10 made of an insulating material is integrally connected to the insulator 12 which insulates the slots 20 of the motor core 18, and the shaft insulating portion 24 of the insulator 12 fitted onto the armature shaft 16 insulates the armature shaft 16 in the area between the insulator 12 and the core portion 28 of the commutator 10. Therefore, there is no possibility that the windings 32 contact the armature shaft 16 in the area between the insulator 12 and the core portion 28 of the commutator 10. This secures the insulating performance, thereby improving the quality.

In the above-described embodiment, the connecting portion 26 of the insulator 12 has protrusions and depressions which are alternately formed in the circumferential direction at predetermined intervals while the insertion groove 30 of the core portion 28 of the commutator 10 has protrusions and depressions which are alternately formed in the circumferential direction at predetermined intervals, and the connection between the commutator 10 and the insulator 12 is established by inserting the connecting portion 26 into the insertion groove 30. However, the shapes of the connecting portion 26 and the insertion groove 30 are not limited to the shapes shown in the above-described embodiment, and various shapes can be employed.

Figure 3A:
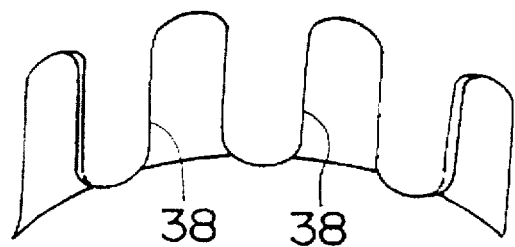
FIGS. 3A and 3B are perspective views showing the connecting portions of the commutator and the insulator according to another embodiment of the present invention.
Figure 3B:
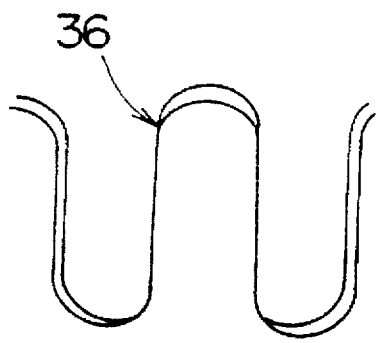
Figure 4A:
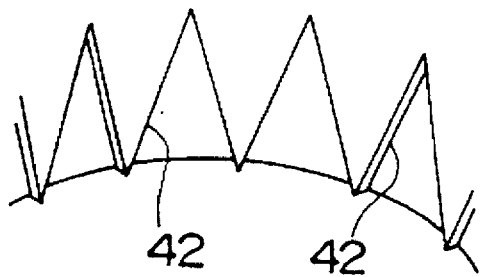
FIGS. 4A and 4B are perspective views showing the connecting portions of the commutator and the insulator according to still another embodiment of the present invention.
Figure 4B:

For example, a connecting portion 36 and an insertion groove 38 shown in FIGS. 3A and 3B may be used in which the ends of the protrusions and depressions individually have a rounded shape. Also, a connecting portion 40 and an insertion groove 42 shown in FIGS. 4A and 4B may be used in which they individually have a saw tooth like shape. Alternatively, a connecting portion 44 and an insertion groove 46 shown in FIGS. 5A and 5B may be used in which their protrusions and depressions individually have a trapezoidal shape. Moreover, a connecting portion 48 and an insertion groove 50 shown in FIGS. 6A and 6B may be used in which they individually have a hexagonal cross section.

Even when these connecting portions and insertion grooves are used, the commutator 10 can be integrally connected and securely fixed to the insulator 12 by inserting the connecting portion 36, etc., of the insulator 12 into the insertion groove 38, etc., of the commutator 10.

Figure 7A:
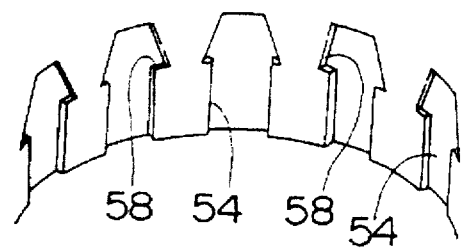
FIGS. 7A and 7B are perspective views showing the connecting portions of the commutator and the insulator according to still another embodiment of the present invention.
Figure 7B:
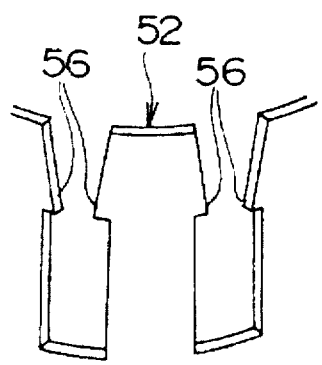
Figure 8A:
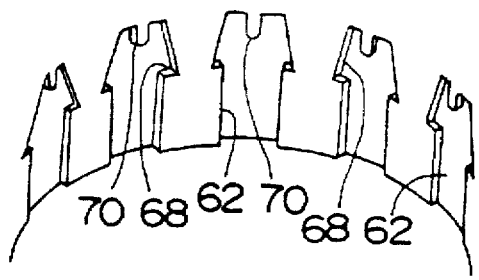
FIGS. 8A and 8B are perspective views showing the connecting portions of the commutator and the insulator according to still another embodiment of the present invention.
Figure 8B:
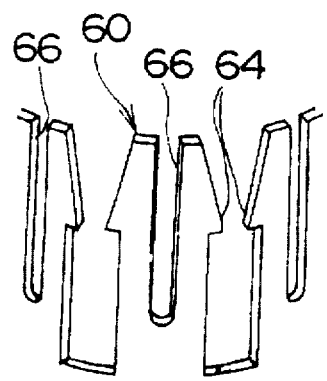

A connecting portion 52 and an insertion groove 54 shown in FIGS. 7A and 7B may be used in which each protrusion of the connecting portion 52 is provided with engagement claws 56 extending from the tip end thereof in the circumferential direction, and the insertion groove 54 is provided with triangular engagement portions 58. Also, a connecting portion 60 and an insertion groove 62 shown in FIGS. 8A and 8B may be used in which each protrusion of the connecting portion 60 is provided with engagement claws 64 extending from the tip end thereof in the circumferential direction and a slit 66, and the insertion groove 62 is provided with engagement portions 68 and a projection 70. Moreover, as shown in FIGS. 9A and 9B, a connecting portion 72 may be used in which each protrusion is provided with a stepped portion extending from the tip thereof in the circumferential direction. In this case, the core portion 28 of the commutator 10 is provided with engagement projections 76 each having a wedge shape.

Figure 10A:
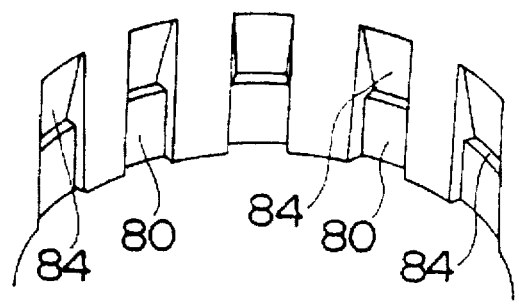
FIGS. 10A and 10B are perspective views showing the connecting portions of the commutator and the insulator according to still another embodiment of the present invention.
Figure 10B:
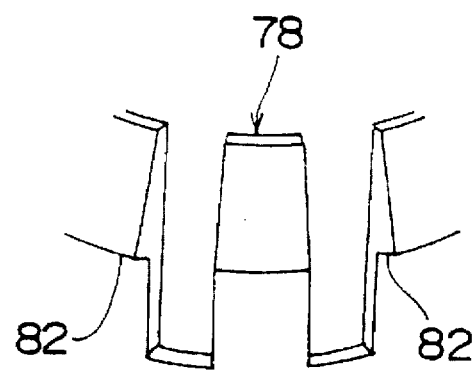
Figure 11A:
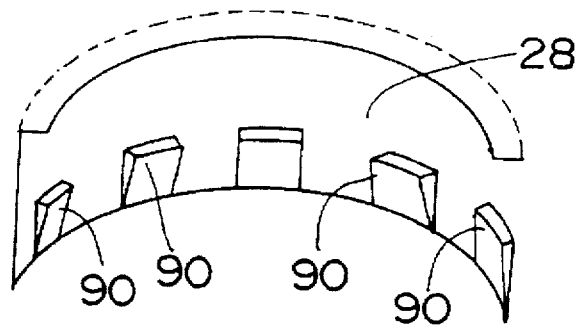
FIGS. 11A and 11B are perspective views showing the connecting portions of the commutator and the insulator according to still another embodiment of the present invention.
Figure 11B:
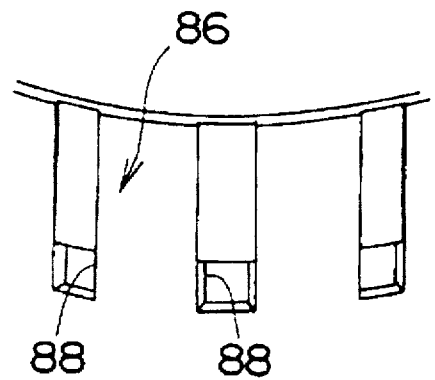

Also, a connecting portion 78 and an insertion groove 80 shown in FIGS. 10A and 10B may be used in which each protrusion of the connecting portion 78 is provided at its tip end with a claw portion 82 radially outwardly projecting from the protrusion, and the insertion groove 80 is provided with engagement portions 84 each having a wedge shape. Alternatively, as shown in FIGS. 11A and 11B, a connecting portion 86 having engagement holes 88 may be used. In this case, the core portion 28 of the commutator 10 is provided with engagement projections 90 each having a wedge shape.

Even when these connecting portions and the insertion grooves are used, the commutator 10 can be integrally connected and securely fixed to the insulator 12 by inserting the connecting portion 52, etc., of the insulator 12 into the insertion groove 54, etc., of the commutator 10. Especially, the fixing force in the axial direction (thrust direction) can be increased.

In the above-described embodiments, an adhesive may be used additionally for increasing the fixing force furthermore.

As described above, the fixing structure for the commutator, the insulator for the motor core, and the motor structure according to the present invention can provide remarkable results in that the fixing force of the commutator can be increased without employing a special machining step while decreasing the costs, and that the secure insulating performance can be obtained such that the quality is improved.

What is claimed is:

1. A rotor for a motor comprising:
   an armature shaft;

a commutator that has a core portion formed from an insulating material and that is positioned on said armature shaft;

a motor core positioned on said armature shaft and around which a winding is wound; and an insulator insulating said motor core, wherein a plurality of concave insertion portions are formed at predetermined intervals along a peripheral direction on an inner peripheral surface of the core portion of said commutator in which said armature shaft is position, and a plurality of convex connecting portions are provided at a commutator side of said insulator, said connecting portions being formed at predetermined intervals along a peripheral direction and inserted into said insertion portions positioned between said armature shaft and an inner peripheral surface of the core portion of said commutator so as to connect said commutator and said insulator.

2. A rotor for a motor according to claim 1, wherein said connecting portions are disposed at a commutator side distal end of a shaft insulating portion provided at a commutator side of said insulator.

3. A rotor for a motor according to claim 1, wherein at least three of said insertion portions and at least three of said connecting portions are formed along the peripheral direction.

4. A rotor for a motor according to claim 1, wherein said motor core is fixed to said armature shaft by press-fitting.

5. A rotor for a motor according to claim 1, wherein said insulator and the core portion of said commutator are formed from a resin.

6. A rotor for a motor according to claim 2, wherein said connecting portions are formed by protrusions and recesses which are alternately formed at an end of a shaft insulating portion at predetermined intervals in the peripheral direction, and said insertion portions are formed by protrusions and depressions which are alternately formed in the core portion of said commutator at predetermined intervals in the peripheral direction.

7. A rotor for a motor according to claim 6, wherein said protrusions and depressions of said connecting portions and said insertion portions, respectively, are formed with corresponding rectangular shapes.

8. A rotor for a motor according to claim 6, wherein said protrusions and depressions of said connecting portions and said insertion portions, respectively, are formed so as to have corresponding rounded shapes.

9. A rotor for a motor according to claim 6, wherein said protrusions and depressions of said connecting portions and said insertion portions, respectively, are formed with corresponding tooth shapes.

10. A rotor for a motor according to claim 6, wherein said protrusions and depressions of said connecting portions of said insertion portions, respectively, are formed with corresponding trapezoidal shapes.

11. A rotor for a motor according to claim 6, wherein said protrusions and depressions of said connecting portions and said insertion portions, respectively, are formed such that said connection portions and said insertion portions have corresponding hexagonal cross-sections.

12. A rotor for a motor according to claim 6 wherein one of said connecting portions and said insertion portions is provided with claw portions extending from the tip of each protrusion thereof, while the other of said connecting portions and said insertion portions is provided with triangular engagement portions formed in each recess or depression thereof.

13. A rotor for a motor according to claim 6, wherein one of said connecting portions and said insertion portions is provided with portions extending from the tip of each protrusion thereof and a slit formed at the center of the tip, while the other of said connecting portions and said insertion portions is provided with triangular engagement portions formed in each depression thereof and a projection formed a the center of the depression.

14. A rotor for a motor according to claim 6, wherein said protrusion of said connecting portions is provided with a stepped portion extending from the tip of the protrusion in the peripheral direction, and said commutator is provided with wedge-shaped engagement projections serving as said insertion portions.

15. A rotor for a motor according to claim 6, wherein each protrusion of said connecting portions is provided with a claw portion radially outwardly projecting from the tip of the protrusion, and said insertion portions are provided with engagement portions each having a wedge shape.

16. A rotor for a motor according to claim 6, wherein said connecting portions are provided with engagement holes while said commutator is provided with engagement projections each having a wedge shape.

* * * * *